Dec. 23, 1930.    W. C. DRURY    1,786,108
CLUSTER ENROBING MACHINE
Filed Dec. 29, 1926    4 Sheets-Sheet 2

Inventor:
Walter C. Drury.
By Mason Fenwick & Lawrence
Attys.

Patented Dec. 23, 1930

1,786,108

UNITED STATES PATENT OFFICE

WALTER C. DRURY, OF FULTON, ILLINOIS

CLUSTER ENROBING MACHINE

Application filed December 29, 1926. Serial No. 157,756.

This invention relates to candy making machines, and more particularly to an automatic cluster enrobing machine adapted to coat the centers thereof with chocolate or the like.

More particularly, the invention has reference to a chocolate coating or automatic cluster enrobing machine which receives the creams or other filler from a shaker and feeds the same in properly timed relation upon the carrier or belt conveyor of the present enrober or chocolate coating machine to be received within the pockets, compartments or chambers of a series of bars arranged in the form of an endless carrier or chain which in properly timed relation are brought beneath a hopper containing peanuts or other like material which are discharged onto the creams in proper quantity and subsequently carried beneath a hopper containing chocolate which is deposited thereon, after which the candy pieces or bars are discharged from the cells or chambers in which they have been traveling and dried and cooled for use, or wrapped if desired.

The invention consists in novel arrangements of parts producing continuously the enrobing or coating operation just alluded to and in which the parts are properly timed to secure accurate alignment of the creams in the pockets beneath the depositing devices for the peanuts and chocolate and subsequently positively ejected, as well as to provide means for properly feeding the chocolate, cleaning the conveying means, provided with the pockets, of the chocolate, so that the same will not clog up and interfere with the engagement thereof over the creams or the reception of the latter in the pockets and the deposit and entrance of the peanuts into the pockets over the creams, as well as to provide novel and simple means for circulating the chocolate in a heated condition, ejecting the coated creams and peanuts or the like in the form of finished candies and for driving all of said parts in an efficient and economical manner with minimum friction and maximum output.

With the above and other objects in view, the invention consists of certain other novel combinations and arrangements of parts as will be hereinafter more fully described and pointed out in the appended claims.

Figures 1, 8:
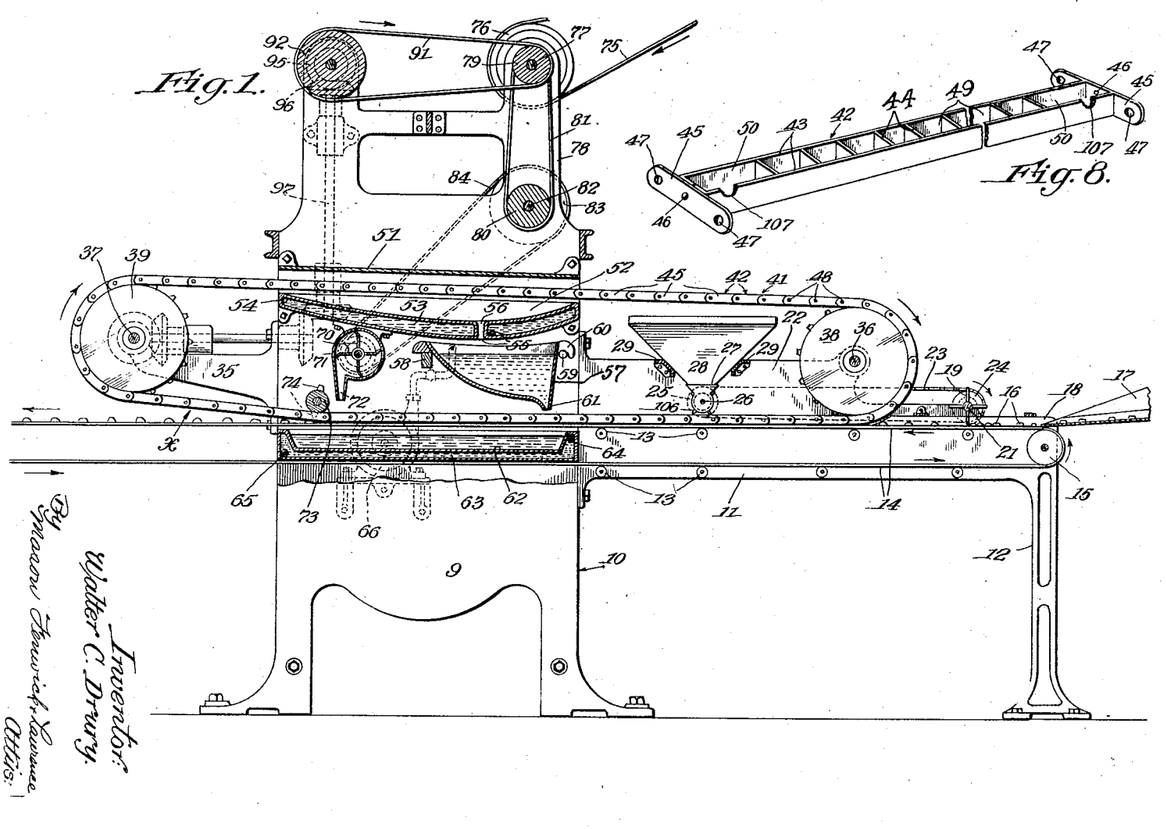
Figure 1 is a longitudinal medial sectional view partly in elevation appearing from the right hand side of the enrober.
Figure 8 is a perspective view partly broken away, showing on an enlarged scale, one of the mould bars with pockets therein constituting the aligning and feeding means for the creams to receive the deposits of peanuts and chocolate for enrobing and coating the same.
Figure 4:
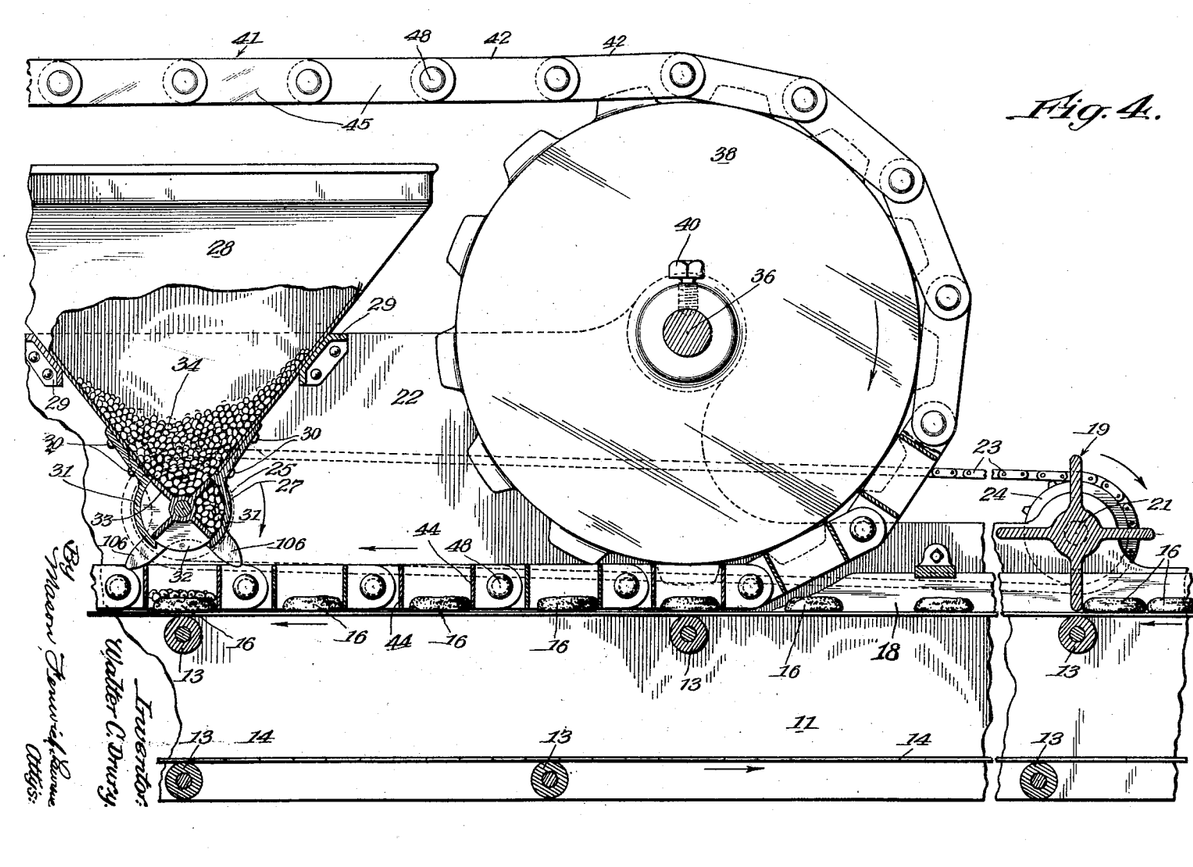
Figure 4 is a fragmental detail drawing of the peanut hopper and the feeding paddle wheel and its associated parts and mold bar chain.

Referring to the drawings in detail, in which like reference characters designate corresponding parts throughout the several views, 10 designates a frame having side portions 9, and extending from this upright frame is a table-like horizontal extension 11 with supports 12, the side portions of this extension having rollers or other bearings 13 mounted therein to receive thereover an endless belt or conveyor 14 preferably of a screenlike type composed of longitudinal flexible wires or strips highly polished and being in turn connected or bound together from sidewise or lateral displacement by transverse pieces of the same material or otherwise as is common in the art. This belt extends around and travels on a roller 15 at the receiving end, and at the opposite end, may extend into a cooling chamber as is common and discharge the finished candies as will be subsequently described onto a wrapping machine or for other treatment. However, since the cooling and wrapping feature constitutes no part of the present invention further description thereof is omitted. The conveyor or belt 14 receives the creams or other fillers designated at 16 from a shaker 17 preferably of the usually enrober shaker type, these creams being fed through the regular rods of an enrober feeding device designated at 18, except that these rods are shortened to about 10 inches, and that the ends of these rods are positioned over the conveyor 14 a short distance to cooperate with spacing and feeding means 19 therefor in the form of a paddle wheel or shutter to allow them to advance at the proper time and in properly spaced relation. This shutter or paddle wheel is preferably provided with four arms the wheel being designated at 19 and having the shutters or blades slotted as at 20 spaced points and rotatable on an axis 21 rotatable in the sides of the frame formed by an upward extension at each side of the frame part 11 as indicated at 22 and driven by an endless belt or chain 23 engaged around sprockets 24 and 25. The latter sprocket or sprocket wheel is fixed to one end of a shaft 26 also journaled in the frame or outlet part 27 of a hopper 28 adapted to contain peanuts or other similar materials which it is desired to discharge or drop upon the creams to be later enrobed or coated with chocolate or other material. The hopper 28 may be supported by suitable brackets 29 or transverse struts or supports connected to the side extensions 22 of the frame extension 11 as clearly shown in Figures 1 and 4 of the drawings, so as to render the same readily detachable for cleaning or repair or for other purposes, in addition to rendering the hopper readily accessible for filling, although it is to be understood that the nuts or other filling may be discharged into the hopper from the the side or top.

The discharge portion 27 of the hopper is preferably composed of two plates secured thereto as indicated at 30 with curved portions 31 providing a bottom discharge opening 32 where said curved portions are spaced apart and within the circular discharge portion of the hopper and over the slot therein is mounted a turn valve or pocket valve core 33 having a series, preferably 4 blades corresponding to the number of the blades of the paddle wheel 19 providing pockets to receive the peanuts or the like designated at 34 so that the same are carried around and discharged at the proper time in a manner to be subsequently more fully described.

Figure 5:
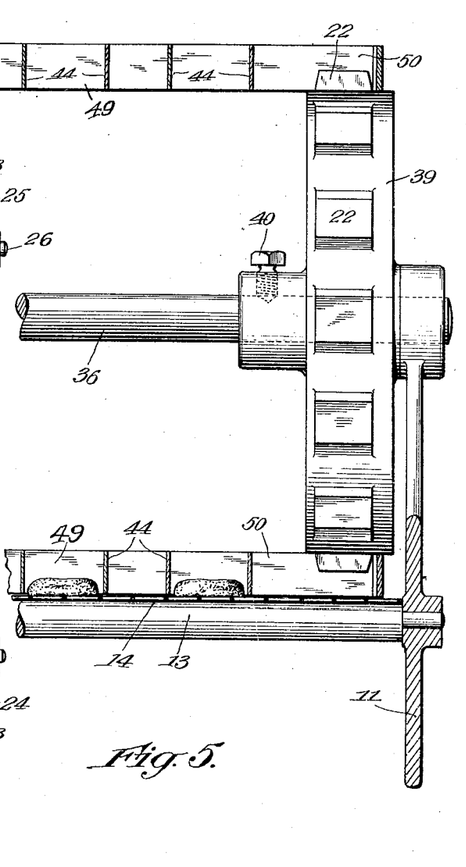
Figure 5 is a detailed view of the transverse mold bars and their mounting.
Figure 6:
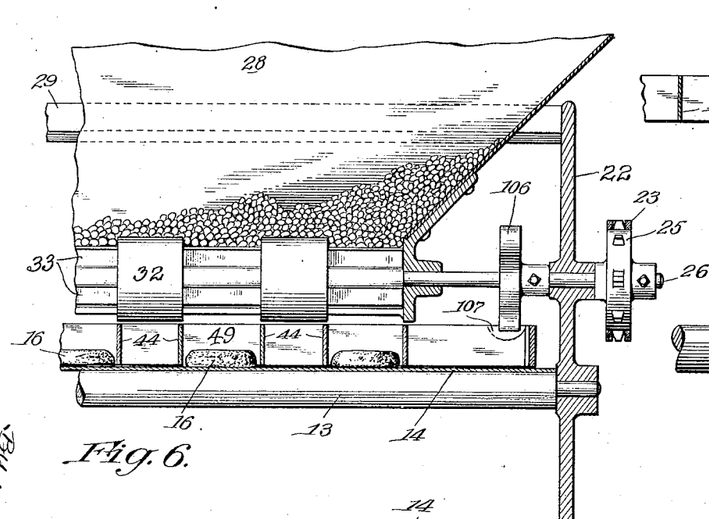
Figure 6 is a fragmental detailed view of a peanut hopper showing more clearly a star wheel feed device.
Figure 7:
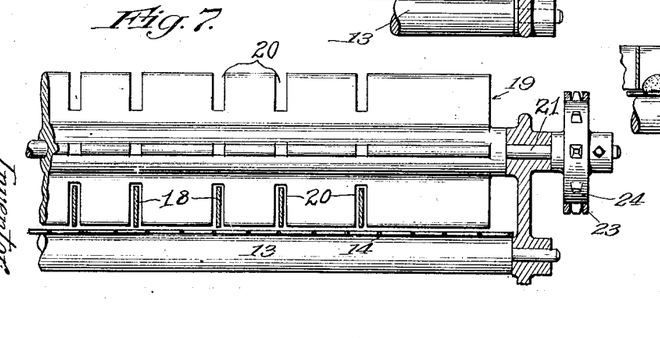
Figure 7 is a fragmental detailed view of the paddle wheel feeding mechanism.

The sides 22 of the frame and extensions 35 at the opposite end are suitably bolted to the uprights 9 of the frame 10, and rotatably support shafts 36 and 37 on which sprocket wheels 38 and 39 are fixed or keyed as by means of set screws 40, and said sprocket wheels take an endless carrier chain 41 in the form of a belt, composed of a series of mold or compartment bars 42 each having side portions 43 and forming a mold bar with a plurality of transversely arranged walls or partitions 44 forming compartments or pockets to receive the creams 16 and convey the same to the peanut or like feeding means and the chocolate coating means as will be more fully set forth. The bars 42 preferably comprise strips bent at two points and having parallel sides formed by moving the ends of the strip beyond the bent portions towards each other although said bars may be otherwise formed and have attached at the ends thereof, strips or links 45 suitably riveted or attached to the ends of the mold bars 42 as indicated at 46 and having projecting ends provided with apertures 47 by which the curved ends of the links are pivotally connected as indicated at 48 so that they are connected to travel around the sprocket wheels in the manner of a chain. This endless carrier 41 may be driven by frictional contact with the endless carrier or belt 14, or may be positively driven, preferably from the same driving mechanism employed for actuating the other parts of the device as will also be further described. It will be noted that the pockets 49 are disposed toward the center portion of the mold bars and spaces 50 are provided near the ends which may take the sprocket wheel teeth and the wires of the shaker 17 or rods thereof, align the creams 16 transversely so that they will properly register with the pockets 49 as the latter are brought into position adjacent to or in juxta position to the top lap of the belt 14 so that the creams will be received in the pockets and conveyed in aligned position to the pocket or discharging means of the hopper 28, it being understood that the latter is provided with the same number of divided discharge members corresponding to the number of pockets 49 as clearly shown in Figures 5, 6 and 7 of the drawings. As a matter of fact, in a preferred form, the alternate pockets 49 are made larger than the intermediate ones so as to receive the creams, while complete separation is provided by the intermediate pockets. However, this is not absolutely essential to the operation of the device and the number and relation of the pockets and peanut discharging means may be varied at will without departing from the spirit and scope of the invention.

The frame 9 supports between its sides 10 a horizontal wall 51, beneath which in spaced relation is arranged a catch basin 52 preferably jacketed as shown to receive hot water or other heating means indicated at 53, although burners may be employed if desired. If hot water or steam is used, the same is supplied through a suitable feed connected with the heating plant of the building or otherwise as indicated at 54 with suitable circulating discharge means 55 and said basin is provided with a discharge opening 56 preferably nearer one end than the other and arranged over a reservoir or basin 57 preferably detachably supported upon a transverse bar 58 and a bar 59 by means of hooks or the like 60. This reservoir is adapted to contain chocolate and has a narrow discharge slot or nozzle 61 extending throughout the width of the machine over the pockets 49 immediately above the lower lap of the mold bar chain or endless carrier 41 as clearly indicated in Figure 1 of the drawing, although any number of slots or nozzles may be employed.

Arranged beneath the lower lap of the chain 41 is a pan 62 preferably hot water or steam jacketed as indicated at 63 with inlet and outlet means 64 and 65 connected to a common source with the jacket of the catch basin 52. As will be noted, the pan 62 is arranged between the upper and lower laps of the endless carrier belt 14, the latter being composed of a series of wires as heretofore pointed out so as to permit the chocolate to readily pass through the upper lap thereof. This pan is adapted to receive overflow chocolate which passes through the bars 42 of the chain 41 in coating or enrobing the creams or other centers which as described in the present instance consist of creams on which have been deposited the peanuts or other cluster formation as shall be found desirable. This construction provides a heated chamber through which the chain 41 passes as will be clearly seen from Figure 1 of the drawings so that the chocolate is maitained in a warm and proper condition of fluidity. Of course, the chocolate which passes from the reservoir 57 into the pan 62, may be returned thereto in any suitable manner, as by means of a pump 66 supported upon a bracket 67 at one side of the frame and having a pipe 68 leading therefrom and controlled by a valve 69 so that the proper supply of chocolate will be maintained in the reservoir 57 to prevent overflow. A blow fan 70 is mounted beneath the basin 52 and has a casing 71 provided with a discharge nozzle 72 extending downwardly in close proximity to the lower lap of the chain 41, the air blast thus produced not only serving to dry the chocolate but to force any loose particles or fluid chocolate in excess of that required, through the pockets of the mould bar chain 41 and the collection of excess chocolate on said bars. It will be noted that the lower lap of the chain 41 immediately after it passes the air blast or blow fan nozzle 72 engages a belt tightening roller 73 which has a series, preferably diametrically opposite projections or teeth 74 adapted to engage in the respective compartments or pockets of the mould bars to positively eject the candy which has been coated, therefrom. The chain then has a riser or extends upwardly at a slight incline as at X in Figure 1 so as to be elevated above the coated fillers or clusters which remain on the upper rearwardly traveling lap of the belt 14 and are carried into the cooling or wrapping mechanism if desired. This results in a positive discharge of the chocolates from the carrier member.

Figure 2:
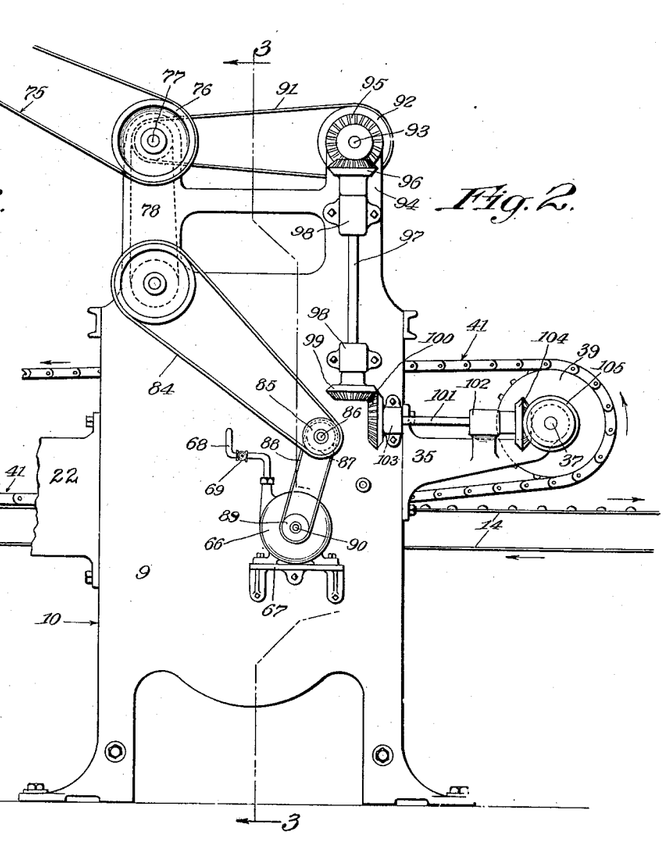
Figure 2 is a left hand side elevation showing more clearly the driving mechanism.
Figure 3:
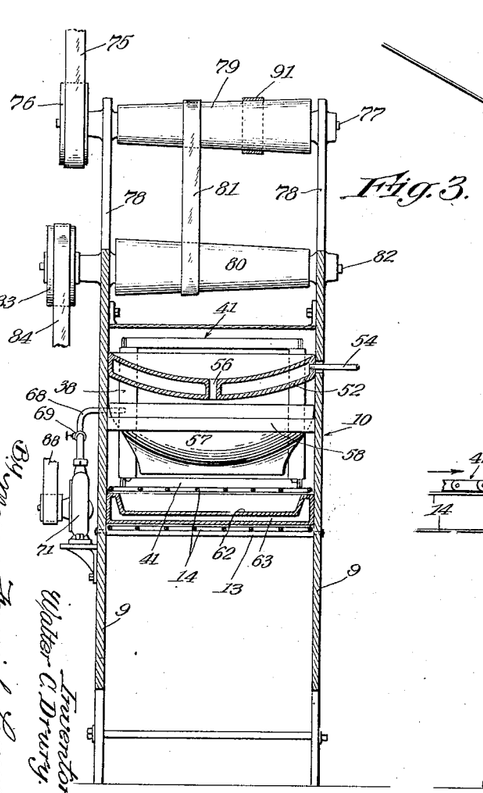
Figure 3 is a cross sectional view taken on line 3—3 of Figure 2.

In order to drive the various parts of the machine, a belt 75 is driven from a suitable countershaft or motor and is trained around a pulley 76 fixed to a shaft 77 in upright extension 78 of the frame 10 or sides 9 thereof and fixed to this shaft there is a conoidal or tapered pulley 79 around which and an oppositely disposed pulley 80 of similar construction therebeneath, a belt 81 is engaged. The pulley 80 is mounted on a shaft 82 and has at one end a pulley 83 around which a belt 84 is engaged or trained, the belt 84 extending around a pulley 85 on a shaft 86 of the blow pan 70 so as to drive the latter. A smaller pulley 87 is also fixed to the shaft 86 and pulley 85 and has a belt 88 trained around it and a small pulley 89 on a shaft 90 of the pump 66 which is preferably of the rotary or centrifugal type as shown, so as to drive the pump for raising the fluid chocolate from the pan 62 to the reservoir 57 as heretofore pointed out. Also trained on the pulley 79 is a belt 91 which is trained on a pulley 92 fixed to a shaft 93 on upright extensions 94 of the frame sides 9, and the shaft 93 carries a beveled pinion or miter gear 95 in mesh with a similar gear 96 preferably of a smaller diameter fixed to the upper end of a shaft 97 rotatable in bearings 98 fixed to one side of the frame 10 as shown in Figure 2. The lower end of the shaft 97 carries a beveled gear 99 meshing with a beveled gear 100 fixed to the inner end of a shaft 101 mounted in a bearing 102 on the extension 35 and a bearing 103 fixed to the side 9 of the frame 10 adjacent to the gear 100. The opposite end of the shaft 101 at the outer end of the arm 35 or frame extension has fixed thereto, a gear 104 which meshes with a similar gear 105 on the shaft 37, thus serving to drive the latter and impart rotation to the sprocket wheels 39 and thus to the endless carrier 41. As heretofore stated, this carrier or chain need not be positively driven but is preferably so and as it rotates, it serves to actuate the ejector 74, the teeth of which serve to eject the coated candies from the pockets. However, the chain may be driven by frictional contact with the belt 14 which may be driven in the usual manner of driving the same in connection with enrobing machines. However, in the present instance the chain 41 is positively driven and as it rotates, the bars 42 engage the respective teeth of the star wheels 106 fixed to the shaft of the turn valve in the bottom of the hopper 28, these star wheels constituting with the chain 41, a Geneva movement to impart intermittent or alternating motion to the valve so that the pockets of peanuts will be discharged immediately over the pockets or compartments of the mold bars containing the creams in the manner clearly shown in Figure 4 of the drawings. This is due to the engagement of the front walls of the mold bars with the teeth of the star wheels 106, so that the valve will be turned and discharge the peanuts onto the creams 16. The valve having been moved in this manner, the rear walls of the bars are provided with notches 107 to pass beneath the next teeth of the star wheel so that the latter will not be rotated for the spaces between the walls where the bars are pivotally connected as indicated at 48, so that alternate pockets are provided with the peanut clusters or other material over the filler to be subsequently coated passing beneath the discharge slot or nozzle of the reservoir 57 from which the continuous narrow stream of chocolate is discharged. Obviously, as the star wheel is actuated, it will through the drive chain 23 connecting the sprocket wheels 24 and 25, actuate the shutter or paddle wheel 19. Thus, the shutter will serve to hold the creams or fillers 16 until the peanuts are discharged from the hopper onto the ones which have been previously advanced to the proper position, and thus the creams will be fed in spaced timed relation on the top lap of the belt 14 by the actuation of the shutter 19. Of course, while the creams are being held by the shutter, the belt 14 will slide beneath the same as it is thought will be readily appreciated. In this manner, proper spacing of the creams is permitted so that they will properly meet with and enter the pockets of the mold bars for receiving the peanuts which are thus held restricted to a certain size until the chocolate has been run over the same to coat or enrobe the candy. It will also be appreciated that the bearings of the shafts 37, 36, belt tightening roller 73 and other suitable parts, may be made adjustable to take up tension, wear or to compensate for slight inaccuracies of movement which it is thought will be readily appreciated by any mechanic acquainted with the art. Such adjustment means is common in mechanisms generally and therefore, no further description or showing is deemed necessary as it will be obvious to one acquainted with the art.

The operation and cycle of the enrober is as follows:

The creams are delivered from the mechanism now employed in the candy making from what is called the shaker and dropped upon a conveyor, said conveyor being of a screenlike nature or composed of longitudinal, flexible steel strips highly polished and being in turn connected or bound together from side displacement by transverse pieces of the same material. This endless belt conveyor is designated by character 14. The creams are conveyed and held by the paddle wheel as is clearly understood and are allowed to pass only when the paddle wheel is actuated by virtue of the star wheels 106 mounted upon the shaft of the valve core in the peanut hopper. In other words, the creams are so timed and spaced to coincide with the transverse mold bars as is very clearly illustrated in Figure 4 of the drawing. The creams are then carried in the path of the peanut hopper 28 and there receive their measured quantity of peanuts, by virtue of the pocket valve core. This valve core is very clearly illustrated on Figure 6 of the drawings and is self-explanatory. The creams with their deposit of peanuts are carried along in a plane of the reservoir or hopper containing the chocolate. This hopper 57 delivers a continuous thin sheet of chocolate transversely, being continuously supplied from the main chocolate reservoir or pan 62 located at a lower plane in the frame work of the machine, the chocolate being raised into the hopper 57 by means of a centrifugal or other pump 60 operated by means of a driving belt and pulley as shown more clearly in Figure 2. The chocolate coated clusters are then passed by an air blast furnished by the fan blower 70 and hence ejected by means of an idler roller 74 as shown very clearly in Figure 1 and from this point they pass along on the screen conveyor into a cooling chamber where at this point they may be wrapped and boxed. This completes the cycle of operation. Of course, it is to be understood that the wire belt or conveyor 14 carries the candies after the chocolate is blown through from the bars at the left hand end of the enrober, onto a disposal belt or otherwise. The heated chamber through which the belts 14 and 41 operate maintains the chocolate thereon in soft runny condition so that it will readily drop into the pan 62 thus maintaining the endless carrier belt and the mold bars clean and remove the chocolate collection or coagulation so that the creams will readily enter the pockets or compartments thereof.

As to the particular novel features which are believed to be patentable from a careful consideration of the prior art and thorough acquaintance with candy manufacture, I claim particularly the use of the mold bars of the endless conveyor or chain which carries the nuts and cream and hold them for a covering of chocolate and then rises leaving the chocolate and nuts on the enrober belt. Heretofore, the nuts, cream and chocolate are mixed in a bar and this has been found unsatisfactory. The present device is complete in itself and constitutes a machine which is simple in construction and operates with a minimum of power and maximum output. As operated by the driving mechanism, the compartments or pockets or the bars will be continuously carried around while the fillers and nuts will be fed thereto intermittently by the Geneva movement and the creams or centers will receive the nuts thereon, after which the same are enrobed or coated with chocolate, the finished cluster being discharged automatically and the operation being repeated. The construction is not only simple but positive in operation. Another advantage is the passing of the chain or bars back through a warm chamber which will melt off the excess chocolate. If the excess chocolate is not removed, the bars will soon collect so much chocolate that they will not allow any nuts to go into the spaces of the bars, and may prevent the proper entrance of the center or cream fillers therein. By my present construction and device, the objections noted are avoided. The automatic control of the feeding of the creams or centers and peanuts, as well as the movement of the mold bar chain, is also believed to be particularly novel as well as the idea of allowing one set or row of creams at a time to proceed along the feed belt 14 to the enrober and having it timed and spaced so that it will automatically come under the spaces of the mold bars of the chain 41, especially consisting of a shutter or paddle wheel as heretofore pointed out so that it will be caused to remain stationary and check the motion of the creams while still permitting the belt 14 to move, thus keeping the creams from moving along the belt while the belt moves under the creams, which latter will be held stationary until fed by the partial rotation or advancement of the paddle wheel or shutter as it turns one-quarter of a revolution for each feeding operation of the peanuts to discharge the latter upon the creams. Of course, the feeding of the creams may be accomplished by any desired feeding mechanism but for purposes of convenience, they may be fed from a regular enrober shaker and through the regular rods of an enrober feeding device except that these rods are shortened to about 10 inches and at the ends of these rods the shutter is stationed. Of course, the shutter may be slightly spaced from the ends of the rods if desired, as shall be found preferable according to the particular type of candy which is being produced. The rods will form the drops or creams into rows and the shutter will allow them to advance at the proper time. No cluster machines of this type have heretofore been produced within my knowledge as an expert in the art, particularly the idea of putting the drops or creams into pockets or compartments of the bars from the opening in the bottom thereof and using a continuous chain of these bars, which simply drop the contents by rising from the enrober belt, although I have provided positive means for ejecting the same after the proper enrobing or coating of the creams and peanuts with the chocolate or other coating as will be apparent. The power for the appliance may consist only of traction, as heretofore pointed out, which the bars or endless chains thereof receive from the belt of the enrober over which they pass, the belt simply carrying the loaded bars and the other bars returning automatically with practically no friction. This naturally will be facilitated by the slight adhesion of the chocolate to the respective parts until separated and until the candies are ejected therefrom. However, it is to be understood that the positive drive mechanism may be employed and will operate efficiently. By this means, a continuous output is permitted.

While I have shown my invention in what I consider to be the preferred form, it is to be understood that I do not desire to be restricted to the exact relation, construction or arrangement of parts illustrated and that various modifications may be made in such arrangements, combinations, proportions and in mechanical expedients especially for driving, so long as the essential and basic or generic features of the invention are embodied and that all ideas and constructions comprehended within the scope of the appended claims are reserved as properly within the scope and spirit of the invention.

Having thus described my invention, what I claim is:

1. In an enrobing machine, a conveyor, means for feeding fillers thereon, an enrober, the conveyor being adapted to transport the fillers therebeneath, means for checking and spacing the fillers in timed relation on to the conveyor, a member for depositing clusters on the fillers and means for actuating the member.

2. In a device of the character described, a conveyor, means for feeding fillers to the conveyor, means for checking the fillers, means for depositing ingredients on the fillers, the checking means being operably positioned for feeding the fillers in spaced relation on the conveyor in such a manner that the ingredients may be received thereon, a coating member, means for supplying the coating member, and means for discharging the coated fillers and ingredients from the device.

3. In an enrobing or coating machine of the class described, mold bars having pockets, means for advancing the mold bars, a carrier operating beneath said advancing means, means for intermittently feeding the fillers to be coated onto the carrier and into the pockets, means for depositing nuts or the like on the fillers, means for thereafter supplying a stream of chocolate or the like onto the fillers and nuts thereon, and means for ejecting the candies from the mold bars.

4. In a coating or enrobing machine, a conveyor, means for feeding fillers onto the conveyor in rows, cluster depositing means, an endless mold bar carrier having compartments for receiving the clusters, means for successively and intermittently releasing the fillers onto the conveyor to be received in the compartments as the mold bar carrier is actuated, means for depositing a coating of chocolate or the like onto the material in the compartments during the advance thereof, means for blowing surplus chocolate from the coated fillers and compartments, and means for actuating said mold bar carrier, said carrier gradually rising away from the conveyor to permit the coated candies to drop from the compartments onto the conveyor, as and for the purposes described.

5. In a coating machine of the class described, a frame, a heated compartment in the frame, means for continuously supplying a stream of coating material in fluid form in said compartment, an endless carrier having a series of mold bars with pockets passing through said compartment beneath said stream, means for conveying fillers to be coated beneath said stream and for registering the fillers with the pockets during the conveyance and coating thereof, and means for separating the mold bars from the coated fillers.

6. In a coating machine of the class described, a frame, a heated compartment in the frame, means for continuously supplying a stream of coating material in fluid form in said compartment, an endless carrier having a series of mold bars with pockets passing through said compartment beneath said stream, means for conveying fillers to be coated beneath said stream and for registering the fillers with the pockets during the conveyance and coating thereof, means for depositing and feeding the fillers onto the conveyor in spaced relation, and means for depositing a cluster of nuts or the like onto the fillers in the pockets, said latter means and the feeding means being actuated by the filler conveying means and mold bar carrier.

7. In an enrobing machine of the class described, a frame, an endless conveyor, means for actuating said conveyor, said frame having a heated chamber through which the conveyor passes, means for supplying a stream of fluid coating material such as chocolate across the chamber of the machine, means for circulating said coating in said chamber and maintaining the same in a fluid condition, and means for checking and advancing the fillers to be coated in spaced rows beneath said stream.

8. In a coating or enrobing machine a conveyor, means for feeding fillers on to the conveyor in rows, a cluster depositing means, an endless mold bar carrier having compartments for receiving the clusters, means for successively and intermittently releasing the fillers on to the conveyor to be received in the compartments as the mold bar carrier is actuated, means for depositing a coating of chocolate or the like on to the material in the compartments during the advance thereof, and means for blowing surplus chocolate from the coated fillers and compartments.

9. In a machine of the class described, a conveyor, a series of molds adapted to advance with the conveyor, a heated chamber through which the conveyor and molds pass, means within the chamber for discharging fluid coating material over the molds, means for separating the molds from the conveyor, and means for positively ejecting the contents of the molds onto the conveyor as the molds are separated therefrom.

10. In a machine of the class described, a conveyor, a series of molds adapted to advance with the conveyor, means for supplying fillers to the conveyor, means for spacing the fillers on the conveyor to register with the molds, means for supplying nuts or the like to the molds intermittently, with means associating the filler spacing means and nut supply means for operating them in predetermined sequence.

11. In a machine of the class described, a conveyor, a series of molds adapted to advance with the conveyor, means for supplying fillers to the conveyor, means for spacing the fillers on the conveyor, means for intermittently discharging nuts into the molds, means for applying a coating to the fillers and nuts in the molds, means for separating the molds from the conveyor, and means for ejecting the coated nuts and fillers from the molds onto the conveyor as the molds are separated therefrom.

12. In a machine of the class described, a conveyor, a series of molds adapted to advance with the conveyor, means for supplying fillers to the conveyor, means for spacing the fillers on the conveyor, means for discharging nuts into the molds, means for discharging a coating into the molds, means for blowing any excess of coating through the molds, means for returning the excess coating thus removed to the main supply, means for separating the molds from the conveyor, and means for ejecting the coated nuts and fillers from the molds onto the conveyor as the former are separated from the latter.

13. In a machine of the class described, an endless conveyor, means for supplying fillers to the conveyor, means for aligning the fillers in rows transversely of the conveyor, an endless chain of mold bars adapted to engage the conveyor over the rows of aligned fillers thereon and travel therewith, means for supplying nuts to the fillers, means for checking the discharge of nuts intermittently, means associating the filler aligning means and nut discharge control means to secure their operation in predetermined sequence with respect to the mold bars, means for supplying a coating to the nuts and fillers in the molds, means for blowing any excess of coating through the molds and conveyor, means for returning such excess of coating to the main supply, and common means for ejecting the coated nuts and fillers from the molds and changing the course of the chain of mold bars to separate same from the conveyor substantially as specified.

In testimony whereof I affix my signature.

WALTER C. DRURY.